United States Patent
Aoki et al.

(10) Patent No.: US 7,468,093 B2
(45) Date of Patent: Dec. 23, 2008

(54) MULTIPLE PHASE ALLOYS AND METAL MEMBRANES FOR HYDROGEN SEPARATION-PURIFICATION AND METHOD FOR PREPARING THE ALLOYS AND THE METAL MEMBRANES

(75) Inventors: Kiyoshi Aoki, Hokkaido (JP); Takeshi Matsuda, Hokkaido (JP); Kazuhiro Ishikawa, Hokkaido (JP)

(73) Assignees: ULVAC Inc., Kanagawa (JP); Kiyoshi AOKI, Hokkaido (JP)

( * ) Notice: Subject to any disclaimer, the term of this patent is extended or adjusted under 35 U.S.C. 154(b) by 555 days.

(21) Appl. No.: 11/059,641

(22) Filed: Feb. 17, 2005

(65) Prior Publication Data

US 2005/0217480 A1     Oct. 6, 2005

(30) Foreign Application Priority Data

Feb. 17, 2004    (JP)    ............................. 2004-039994

(51) Int. Cl.
  *B01D 53/22*    (2006.01)
  *B01D 71/02*    (2006.01)
(52) U.S. Cl. ..................... 95/56; 95/55; 96/4; 96/8; 96/10; 96/11; 55/524; 55/DIG. 5
(58) Field of Classification Search ............ 96/4, 96/8, 10, 11; 95/55, 56; 55/523, 524, DIG. 5
  See application file for complete search history.

(56) References Cited

U.S. PATENT DOCUMENTS

| | | | |
|---|---|---|---|
| 4,781,734 A | | 11/1988 | Behr et al. |
| 6,428,634 B1 * | | 8/2002 | Besselink et al. ............ 148/421 |
| 6,461,408 B2 * | | 10/2002 | Buxbaum ....................... 95/56 |
| 6,649,559 B2 * | | 11/2003 | Drost et al. ..................... 95/56 |
| 7,001,446 B2 * | | 2/2006 | Roark et al. .................... 95/56 |
| 2007/0068383 A1 * | | 3/2007 | Sasaki et al. ................... 95/56 |

FOREIGN PATENT DOCUMENTS

| | | |
|---|---|---|
| EP | 0 873 734 A2 | 10/1998 |
| JP | 7-252553 * | 10/1995 |
| JP | 08-215551 | 8/1996 |
| JP | 2004-42017 * | 2/2004 |
| WO | 95/12218 | 5/1995 |
| WO | WO 95/12218 * | 5/1995 |

(Continued)

OTHER PUBLICATIONS

Patent Abstract for Patent No. JP 07-252553 published Oct. 3, 1995 in Japan.

(Continued)

*Primary Examiner*—Jason M Greene
(74) *Attorney, Agent, or Firm*—Arent Fox LLP

(57) ABSTRACT

An Ni—Ti—Nb based multiple phase alloy consists of a combined phase which comprises a phase for the hydrogen permeability and a phase for the resistance to hydrogen embrittlement. The alloy has a composition satisfying the formula: $Ni_xTi_yNb_{(100-x-y)}$ in which x=25~45 mol % and y=25~55 mol %. A metal membrane for hydrogen separation-purification is prepared using the alloy material. The alloy material is prepared by blending Ni, Ti and Nb and melting the blend. The metal membrane permits the hydrogen separation-purification and thus the resulting purified hydrogen gas can be used as a fuel and can be applied to fields of production of semiconductors.

19 Claims, 5 Drawing Sheets

White Phase: NbTi ($Ni_4Ti_{13}Nb_{83}$) = 40% by volume
Gray Layer Structure: Eutectic Mixture of NiTi
and NbTi($Ti_{38.4}Ni_{41.1}Nb_{20.5}$)

FOREIGN PATENT DOCUMENTS

WO              95/27092      10/1995

OTHER PUBLICATIONS

Patent Abstract for Patent No. JP 2000-159503 published Jun. 13, 2000 in Japan.

Patent Abstract for Patent No. JP 2003-095616 published Apr. 3, 2003 in Japan.

Wang et al. "Electrochemical Hydrogen and Lithium Absorption/Desorption in $Tl_{46}Ni_{45}Nb_9$ Alloy in Aqueous Electrolytes", J. of Power Sources 75, pp. 122-129 (1998).

* cited by examiner

White Phase: NbTi (Ni$_4$Ti$_{13}$Nb$_{83}$) = 40% by volume
Gray Layer Structure: Eutectic Mixture of NiTi
and NbTi(Ti$_{38.4}$Ni$_{41.1}$Nb$_{20.5}$)

10 μm

MULTIPLE PHASE ALLOYS AND METAL MEMBRANES FOR HYDROGEN SEPARATION-PURIFICATION AND METHOD FOR PREPARING THE ALLOYS AND THE METAL MEMBRANES

BACKGROUND OF THE INVENTION

The present invention relates to multiple (or dual) phase alloys for hydrogen separation-purification and a method for the preparation of such alloys, as well as a metal membrane for hydrogen separation-purification and a method for the preparation of such a metal membrane.

In the preparation of various materials such as semiconductors, optical fibers and drugs, there has been used highly purified hydrogen gas and the amount thereof used therein has gradually been increased year by year. In addition, hydrogen gas has become of major interest lately as the fuel for a fuel cell. If such fuel cell is used in full-scale in the future, a considerable quantity of hydrogen gas would have to be supplied. For this reason, there has been desired for the development of a technique which permits the production of highly purified hydrogen gas in a large quantity at low cost.

As methods for preparing a large quantity of hydrogen gas, there have been proposed, for instance, (1) a method for preparing hydrogen gas which makes use of natural resources other than fossil ones or which comprises the step of the electrolysis of water and (2) a method which makes use of fossil natural resources or which comprises the step of reforming of hydrocarbons. As the electrolysis method (1), there has been investigated a method of electrolyzing water using electric energy obtained through the photovoltaic power generation or solar-electric power generation as an electric power source, but this method in the present technical status cannot be put to practical use. It would accordingly be practical that hydrogen gas is produced according to the method (2) or the steam reforming of hydrocarbons.

As has been described above, the reforming of hydrocarbons is suitable for the mass-production of hydrogen gas. For instance, in a reaction system comprising $CH_4$ to which $H_2O$ has been added, a large amount of hydrogen gas is generated according to the following reaction scheme [reaction formulas (1) to (3)]:

$$CH_4+H_2O \leftrightarrows CO+3H_2 \text{[Gasification Reaction (endothermic reaction)]} \quad (1)$$

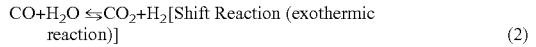
$$CO+H_2O \leftrightarrows CO_2+H_2 \text{[Shift Reaction (exothermic reaction)]} \quad (2)$$

$$(1)+(2)=(3)$$

$$CH_4+2H_2O \leftrightarrows CO_2+4H_2 \text{[Endothermic Reaction]} \quad (3)$$

The reforming reaction takes place according to the reaction formulas (1) and (2) and the overall reforming reaction takes place according to the reaction formula (3). The reaction system includes contaminant gases such as CO, $CO_2$, $H_2O$ and $CH_4$ in addition to a large amount of hydrogen gas. To use hydrogen gas as a supply for a fuel cell, hydrogen gas should be purified and/or separated from these impurities. Moreover, the Pt electrode of such a fuel cell may be damaged unless the purified hydrogen gas has a CO content of not more than 10 ppm. In other words, the hydrogen gas should be purified to a high degree of purity before using the same in a fuel cell.

As methods for purifying hydrogen gas, there have been known, for instance, an absorption method, a cryogenic separation method or deep freezing processing method, an adsorption method and a membrane separation method. Among these, practically used is the membrane separation method. The membrane separation method makes use of the difference in the rate of membrane-permeation between various gases and the method employs a polymer film or a metal film as such a membrane.

In the membrane separation method using a polymer film, hydrogen gas is isolated and/or purified on the basis of the difference in the diffusion rate between gas molecules which pass through fine pores of the membrane or film. In this membrane separation method, it is difficult to provide hydrogen gas highly purified to a satisfactory level, but it permits the scaling up of the system for the preparation of purified hydrogen gas.

On the other hand, the metal membrane is almost free of any fine pore present in the polymer membrane and therefore, the hydrogen purification mechanism is as follows: If there is a difference in the hydrogen gas pressure between two compartments separated by a metal membrane, hydrogen molecules ($H_2$) in the high pressure compartment are decomposed into elemental hydrogen or hydrogen atoms (H) on the metal membrane surface, and the resulting hydrogen atoms are then solubilized or dissolved into the metal membrane and undergo penetration and/or diffusion into the metal to thus form a solid solution. These hydrogen atoms permeate the metal membrane and are again combined into hydrogen molecules ($H_2$) on the other surface of the metal membrane and emitted into the low pressure compartment and thus, hydrogen gas is purified. The hydrogen purification is significantly affected by the separation constant and permeability constant of the metal membrane. The purification which makes use of a metal membrane would permit the purification of hydrogen gas having a purity of about 99% into hydrogen gas having a purity of about 99.99999%. For this reason, it would be said that the membrane separation method using a metal membrane is suitably used for the preparation or purification of highly purified hydrogen gas which can be used in the fuel cell.

As hydrogen-permeable metal membrane capable of being used as hydrogen gas-separation membrane, there have been known, for instance, Pd-based alloys such as Pd—Ag alloys and Pd—Ti alloys (see, for instance, Japanese Un-Examined Patent Publication Hei 8-215551 (Section 0006 appearing on page 2)). Presently, there has been put on the market a Pd—Ag alloy membrane as a metal membrane for hydrogen separation-purification. If the fuel cell is used in full-scale and this accordingly requires the supply of a considerable quantity of hydrogen gas, the demand for such Pd—Ag alloy membrane would correspondingly be increased, which are used as the metal membrane for hydrogen separation-purification. Under such circumstances, one cannot take measures to meet the increasing demand for the Pd—Ag alloy foils since Pd is quite expensive and it is limited in the quantity as resources. Accordingly, it would be urgent to develop materials for such a metal membrane as a substitute for the Pd—Ag alloy membrane.

To highly efficiently use a metal membrane for the separation and/or purification of hydrogen gas, it would be quite important that the metal membrane has a high hydrogen-permeability and that the metal membrane can withstand the hydrogen gas pressure difference applied thereto or the membrane should have a high resistance to hydrogen embrittlement. In other words, the mechanical properties likewise serve as important factors. As a metal membrane serving as substitutes for the Pd—Ag alloy membrane, there have been investigated and developed V-M (M means a metal) solid solution single-phase alloys. However, in order to use the alloys as the metals for hydrogen-purification, the alloys should simultaneously satisfy the requirements for the hydrogen gas-permeability and for the resistance to hydrogen embrittlement. Accordingly, it would be impossible for a single metal and the above-mentioned solid solution single-phase alloy to simultaneously satisfy these two requirements.

SUMMARY OF THE INVENTION

Accordingly, it is, in a broad sense, an object of the present invention to solve the foregoing problems associated with the conventional techniques and more specifically to provide a multiple phase alloy for use in hydrogen separation-purification, which can simultaneously satisfy the requirements for the hydrogen gas-permeability and for the resistance to hydrogen embrittlement, and a method for the preparation of such an alloy, as well as a metal membrane for hydrogen separation-purification, which consists of the foregoing alloy, and a method for the preparation of such a metal membrane.

The inventors of this invention have conducted various studies to solve the foregoing problems, have found that an alloy capable of simultaneously satisfying the foregoing two requirements can be realized by a multiple phase (or double phase) alloy which comprises a phase responsible for the hydrogen gas-permeability and a phase responsible for the resistance to hydrogen embrittlement and that these problems can be solved by the use of such a multiple phase alloy and have thus completed the present invention.

According to an aspect of the present invention, there is provided an Ni—Ti—Nb based multiple phase alloy for use in hydrogen separation-purification, which is characterized in that it comprises multiple phases or two phases, one of which is responsible for the hydrogen gas-permeability and the other of which is responsible for the resistance to hydrogen embrittlement.

According to a preferred embodiment of the present invention, the multiple phases comprise an eutectic mixture of an NbTi phase in which Ni is occluded or dissolved and which is responsible for the hydrogen gas-permeability (hereunder referred to as NbTi phase) and an NiTi phase in which Nb is occluded or dissolved and which is responsible for the resistance to hydrogen embrittlement (hereunder referred to as NiTi phase); or a phase comprising such an eutectic mixture (NbTi phase+NiTi phase) and the initial phase NbTi. This initial phase NbTi is surrounded by the eutectic mixture (NbTi phase+NiTi phase). Thus, the multiple phase structural alloy of the present invention would permit the efficient hydrogen separation-purification.

In another preferred embodiment of the present invention, the foregoing Ni—Ti—Nb based multiple phase alloy for use in hydrogen separation-purification consists of an alloy represented by the following formula: $Ni_xTi_yNb_{(100-x-y)}$ (wherein x=25~45 mol % and y=25~55 mol %). If x is less than 25 mol %, the resulting metal membrane cannot be used as a membrane for hydrogen separation-purification, because of its embrittlement through the occlusion of hydrogen, while if x exceeds 45 mol %, the resulting metal membrane has a considerably low hydrogen-permeability constant and accordingly, it is not suitably used as a metal membrane for hydrogen separation-purification. Further, if y is less than 25 mol %, the resulting metal membrane undergoes embrittlement and therefore, the hydrogen permeability thereof cannot be determined and thus, the membrane cannot be used as a membrane for hydrogen separation-purification. On the other hand, if y exceeds 55 mol %, the resulting metal membrane likewise undergoes embrittlement and therefore, it cannot be used as a membrane for hydrogen separation-purification.

According to a further embodiment of the present invention, the foregoing Ni—Ti—Nb based alloy shows ductility at room temperature in the air. The alloy for hydrogen separation-purification should be fixed to another structure prior to its practical use. In this connection, if the metal membrane is free of any ductility at room temperature in the air, it would break when it is fixed to another structure and thus, it cannot be used in the hydrogen separation-purification.

According to another aspect of the present invention, there is provided a method for the preparation of the foregoing Ni—Ti—Nb based multiple phase alloy for hydrogen separation-purification, which is characterized in that it comprises the steps of blending desired amounts of Ni, Ti and Nb and then melting the resulting blend according to the arc melting technique carried out in an inert gas atmosphere; melting the blend by the high frequency induction heating technique carried out in an inert gas atmosphere or in a vacuum; melting the same by the electron beam melting technique carried out in a vacuum; or melting the same by the laser beam heating technique.

According to still another aspect of the present invention, there is provided a metal membrane for use in hydrogen separation-purification, which is characterized in that it consists of the foregoing Ni—Ti—Nb based multiple phase alloy for hydrogen separation-purification or the multiple phase alloy prepared according to the foregoing method.

In a preferred embodiment of the present invention, the metal membrane has a thickness ranging from 0.1 to 3 mm. If the thickness exceeds 3 mm, the resulting metal membrane shows a reduced hydrogen-permeability flux (quantity) and thus the efficiency of hydrogen permeation through the membrane is impaired. On the other hand, if the thickness is less than 0.1 mm, the resulting metal membrane has insufficient mechanical strength and accordingly, it is not usable as a metal membrane for hydrogen separation-purification.

According to a further embodiment of the present invention, the metal membrane is characterized in that it comprises additional Pd films or Pd alloy films on the both sides of the metal membrane or on one side thereof to which a feed material is supplied and on the other side thereof from which the purified hydrogen is removed and that the thickness of these Pd films or Pd alloy films ranges from 50 to 400 nm. In other words, additional Pd films or Pd alloy films, each having a desired thickness, are formed on one side of the Ni—Ti—Nb based alloy membrane to which a feed material to be treated is supplied (the upstream side, the high pressure side) and on the other side thereof from which the purified hydrogen is removed (the downstream side, the side of low pressure hydrogen) in such a manner that the Ni—Ti—Nb based alloy membrane may be sandwiched by these Pd films or Pd alloy films and the resulting composite metal membrane would permit efficient dissociation of hydrogen molecules and efficient recombination of hydrogen atoms. In this respect, if the thickness of the Pd films or Pd alloy films is beyond the range specified above, the resulting composite metal membrane is insufficient in the efficiency of dissociation and recombination of hydrogen.

In a still further embodiment of the metal membrane, the foregoing Pd films or Pd alloy films are formed by the vacuum deposition technique, the sputtering technique, or the ion-plating technique.

According to a still further aspect of the present invention, there is provided a method for the preparation of the foregoing Ni—Ti—Nb based metal membrane for use in hydrogen separation-purification and the method comprises the steps of blending desired amounts of Ni, Ti and Nb in such a manner that the resulting Ni—Ti—Nb based alloy has a composition satisfying the formula: $Ni_xTi_yNb_{(100-x-y)}$ (wherein x=25~45 mol % and y=25~55 mol %); melting the resulting blend according to the arc melting technique carried out in an inert gas atmosphere, the high frequency induction heating technique carried out in an inert gas atmosphere or in a vacuum, the electron beam melting technique carried out in a vacuum, or the laser beam heating technique, to form a metal membrane; and then forming Pd films or Pd alloy films on the both sides of the metal membrane or on the side thereof to which a feed material to be treated is supplied and on the other side thereof from which the purified hydrogen is removed.

As has been described above, the present invention permits the formation of an alloy, an alloy membrane simultaneously having excellent hydrogen gas-permeability and excellent resistance to hydrogen embrittlement by the use of a multiple phase alloy comprising a phase responsible for a high hydrogen gas-permeability and a phase responsible for a high resistance to hydrogen embrittlement, for instance, Ni—Ti—Nb based multiple phase alloy having a specific composition.

BRIEF DESCRIPTION OF THE DRAWINGS

The present invention will hereunder be described in more detail with reference to the accompanying drawings, wherein.

DESCRIPTION OF THE PREFERRED EMBODIMENTS

Figure 1:
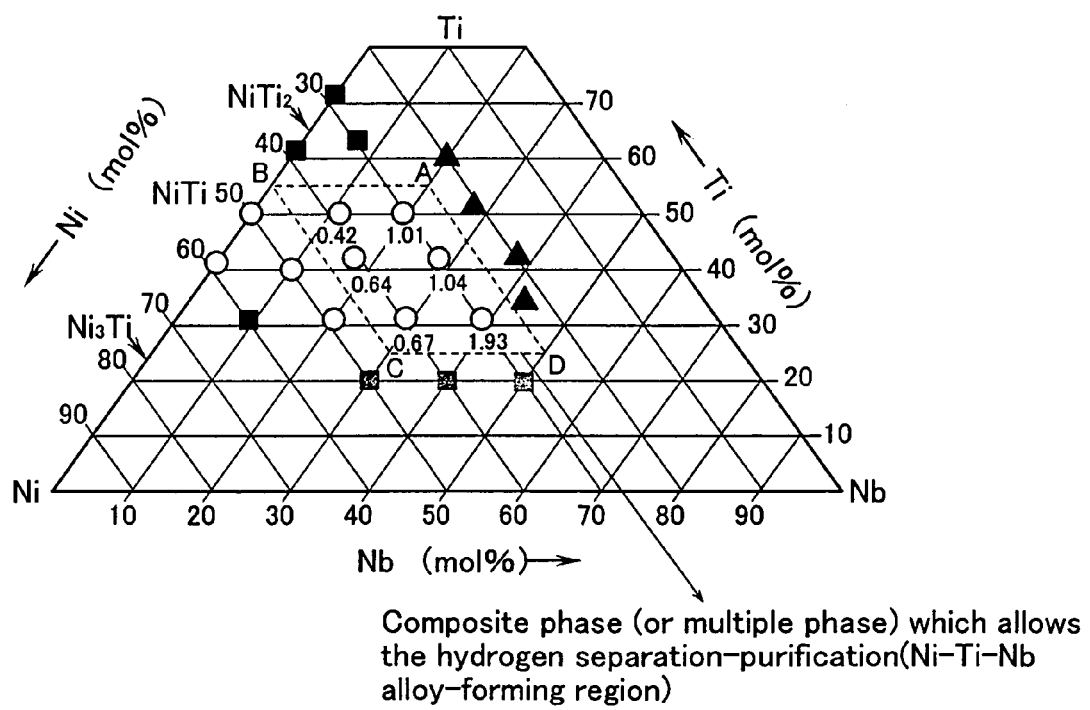
FIG. 1 is a phase diagram of a three-component system showing the composition range (mol %) required for preparing an Ni—Ti—Nb based multiple phase alloy used for hydrogen separation-purification according to the present invention. In this figure, the numerical values given below the open circles present within the region surrounded by the broken lines AB, BC, CD and DA represent hydrogen permeability constants observed for the alloy materials prepared in Examples 1 to 6, respectively.

The inventors of this invention have variously investigated phase diagrams of three-component systems comprising a variety of metals and as a result, the inventors have found that an Ni—Ti—Nb based alloy is useful as a material for the preparation of a metal membrane used in the hydrogen separation-purification process.

In an embodiment of the present invention, a membrane consisting of an Ni—Ti—Nb based alloy is used as a metal membrane used in the hydrogen separation-purification process. This metal membrane comprises a multiple or dual phase alloy having a composite phase which comprises a phase responsible for a desired high level of hydrogen gas-permeability and a phase likewise responsible for a desired high level of resistance to hydrogen embrittlement. Thus, the composition of the Ni—Ti—Nb based alloy material may be so controlled that it can satisfy the following relation: $Ni_xTi_yNb_{(100-x-y)}$ (wherein x=25~45 mol % and y=25~55 mol %) and accordingly, there can be provided a multiple phase alloy material consisting of an eutectic mixture (NiTi+NbTi) comprising NbTi which is excellent in the hydrogen permeability, but suffers from hydrogen embrittlement and NiTi which is insufficient in hydrogen permeability, but is excellent in the resistance to hydrogen embrittlement or a multiple phase alloy material consisting of this eutectic mixture and the initial phase NbTi. A metal membrane may be prepared from, for instance, a cast alloy material obtained from the multiple phase alloy material. This multiple phase alloy material is excellent in the both hydrogen permeability and the mechanical strength (ductility) and therefore, it is suitable for use in the preparation of a metal membrane for hydrogen separation-purification. The hydrogen permeability constant of this multiple phase alloy material may vary depending on the composition thereof, but the hydrogen permeability thereof is almost identical to or superior to that observed for the Pd alloy membrane presently used as such a metal membrane for hydrogen separation-purification.

The metal membrane consisting of the multiple phase alloy according to the present invention is less expensive since it can be prepared at a cost of ⅕ to 1/10 time that required for the preparation of the Pd alloy membrane and this material would be a material suitable as a substitute for Pd whose natural resources will be exhausted in the not very distant future.

The Ni—Ti—Nb based alloy material can be prepared by blending Ni, Ti and Nb in such a manner that the resulting blend has a desired composition and then preferably melting the resulting blend according to the arc melting technique carried out in an inert gas atmosphere such as an Ar gas atmosphere, the high frequency induction heating technique carried out in an inert gas atmosphere such as an Ar gas atmosphere or in a vacuum, the electron beam bombardment melting technique carried out in a vacuum, or the laser beam heating technique. The experimental data obtained using a variety of systems having a large number of compositions clearly indicate that the composition of the alloy material: $Ni_xTi_yNb_{(100-x-y)}$ suitably used in the hydrogen separation-purification falls within the range specified by x=25~45 mol % and y=25~55 mol % and in more specifically, useful in the present invention are those having compositions falling within the region surrounded by the broken lines AB, BC, CD and DA in FIG. 1. As will be detailed in Comparative Examples given later, the filled square (■) appearing in FIG. 1 means that the alloy having the corresponding composition suffers from embrittlement in the cast state; the filled triangle (▲) likewise appearing therein indicates that the alloy having the corresponding composition undergoes embrittlement after the determination of the hydrogen permeability constant or through the hydrogenation; and the open circle (○) means that the alloy having the corresponding composition is excellent in the ductility, but has a low hydrogen permeability constant. All of these alloy materials are not suitably used in the preparation of the metal membrane for hydrogen separation-purification.

In the present invention, the thinner the metal membrane for hydrogen purification, the higher the hydrogen-permeation flux (quantity) and thus the higher the hydrogen permeability of the metal membrane. However, the mechanical strength of the metal membrane is lowered as the thickness thereof is reduced. For this reason, the thickness of the metal membrane preferably ranges from 0.1 to 3 mm in the case of the Ni—Ti—Nb based alloy membrane.

The alloy used for hydrogen separation-purification should be fixed to another structure prior to its practical use. In this connection, if the metal membrane is free of any ductility at room temperature in the air, it may undergo breakage when it is fixed to another structure and thus, it cannot be used in the hydrogen separation-purification. For this reason, it is preferred that the metal membrane has an ability of causing plastic deformation on the order of at least about 1% at room temperature in the air.

When using the Ni—Ti—Nb based alloy material as a material for forming a metal membrane for hydrogen separation-purification, it is necessary to form additional Pd films or Pd alloy films, each having a desired thickness, on the starting gas supply side of the Ni—Ti—Nb based alloy membrane (the upstream side, the high pressure hydrogen supply side) and on the purified hydrogen removal side thereof (the downstream side, the low pressure hydrogen side) in such a manner that the resulting composite metal membrane would permit efficient dissociation of hydrogen molecules and efficient recombination of hydrogen atoms. In other words, the Ni—Ti—Nb based alloy membrane is sandwiched by these Pd films or Pd alloy films. In this respect, the thickness of the Pd films or Pd alloy films in general ranges from 50 to 400 nm and preferably 100 to 200 nm.

In this respect, it is not necessary to adopt any particular method for the formation of such Pd films or Pd alloy films on the both sides of the Ni—Ti—Nb based alloy membrane for the efficient dissociation of hydrogen molecules on the one side and efficient recombination of hydrogen atoms on the other side. These Pd films or Pd alloy films may be formed by, for instance, the vacuum deposition technique, the sputtering technique, or the ion-plating technique.

The present invention will hereunder be described in more detail with reference to the following working Examples and Comparative Examples, but the present invention is not restricted to these specific Examples at all.

EXAMPLE 1

After blending desired amounts of Ni (having a purity of 99.9%), Ti (having a purity of 99.5%) and Nb (having a purity of 99.9%) such that the resulting alloy material had a composition: $Ni_xTi_yNb_{(100-x-y)}$ specified by x=30 mol % and y=31 mol %, the resulting blend was melted by the arc melting technique carried out in an Ar gas atmosphere to thus form an ingot. Thereafter, a circular disk having a diameter of 12 mm and a thickness of 0.6 mm was cut from the resulting ingot by the discharge processing technique to give a test sample.

A scanning electron microscope (SEM) was used for the observation of microstructures of the sample and an X-ray diffraction device (XRD) was employed for the analysis of the crystalline structure thereof. The chemical composition of each test sample was determined using an energy dispersive fluorescent X-ray spectroscopic device (SEM-EDX). The rate of volume occupation of each particular phase was calculated by a Mackintosh computer with the assistance of Public Domain NIH Image Program. The both sides of each disk-like test sample were polished using sandpaper, buff and then alpha-alumina powdery abrasive having a diameter of 0.5 μm and then a Pd film was formed on each side of the test sample according to the RF magnetron sputtering technique, to a thickness of 190 nm.

The determination of the hydrogen-permeability of each test sample was carried out according to the following flow rate method: First of all, the disk-like test sample carrying the foregoing Pd films on the both sides thereof was sealed with a Cu gasket. Then the both sides of the disk were evacuated using an oil-diffusion pump to a pressure of not more than $3\times10^{-3}$ Pa, the disk was then heated to a temperature of 673K and it was then maintained at that temperature. Thereafter, hydrogen gas (having a purity of 99.99999%) was introduced into the downstream and upstream sides of the disk-like sample at pressures of 0.1 and 0.2 MPa, respectively, followed by the determination of the hydrogen permeability of the disk. Then the hydrogen pressure at the upstream side was increased from 0.2 MPa to 0.97 MPa and the temperature thereof was gradually reduced from 673K to 523K. The hydrogen permeation flux J ($mol\cdot H_2(m^{-2}s^{-1})$) was determined using a mass flow meter.

In general, the hydrogen-permeable material is used in a region in which it can form a hydrogen-solid solution and in such a case, the hydrogen permeation flux J is related to the hydrogen permeability constant Φ ($mol\cdot H_2(m^{-1}s^{-1}Pa^{-0.5})$) by the following equation:

$$J \times L = \Phi(Pu^{0.5} - Pd^{0.5}) \quad (4)$$

In the foregoing equation, Pu and Pd (Pa) represent the hydrogen pressures on the upstream side and the downstream side of the disk, respectively, and L means the thickness (m) of the disk. The hydrogen permeability constant Φ can thus be determined from the gradient of the graph on which the values of J×L are plotted against the values of ($Pu^{0.5} - Pd^{0.5}$).

Figure 2:
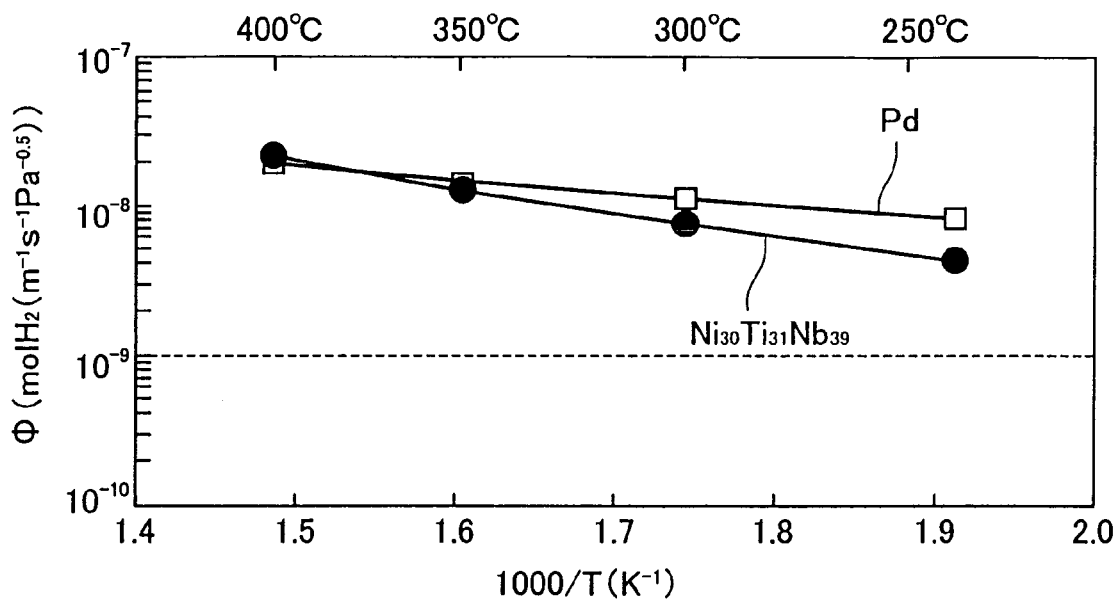
FIG. 2 is a graph showing the temperature-dependency of the hydrogen permeability constant observed for the alloy material: $Ni_{30}Ti_{31}Nb_{39}$ prepared in Example 1, which is in the cast state, while comparing the same with that observed for the comparative pure Pd article.

As to the alloy material $Ni_{30}Ti_{31}Nb_{39}$ prepared by the foregoing procedures, the temperature-dependency of the hydrogen permeability constant Φ as calculated from the gradient of the J×L–($Pu^{0.5} - Pd^{0.5}$) plot is shown in FIG. 2 in the form of Arrhenius plot. The results observed for the sample of pure Pd are also shown in FIG. 2 by way of comparison. The both hydrogen permeability constants observed for these two samples were reduced as the temperature was reduced. The degree of reduction in the hydrogen permeability constant observed for the alloy material $Ni_{30}Ti_{31}Nb_{39}$ was higher than that observed for the sample of pure Pd. However, the hydrogen permeability constant observed for the alloy material $Ni_{30}Ti_{31}Nb_{39}$ as determined at 673K (400° C.) was found to be $1.93\times10^{-8}$ ($mol\cdot H_2(m^{-1}s^{-1}Pa^{-0.5})$) which was almost identical to or superior to that observed for the pure Pd.

Figure 3:
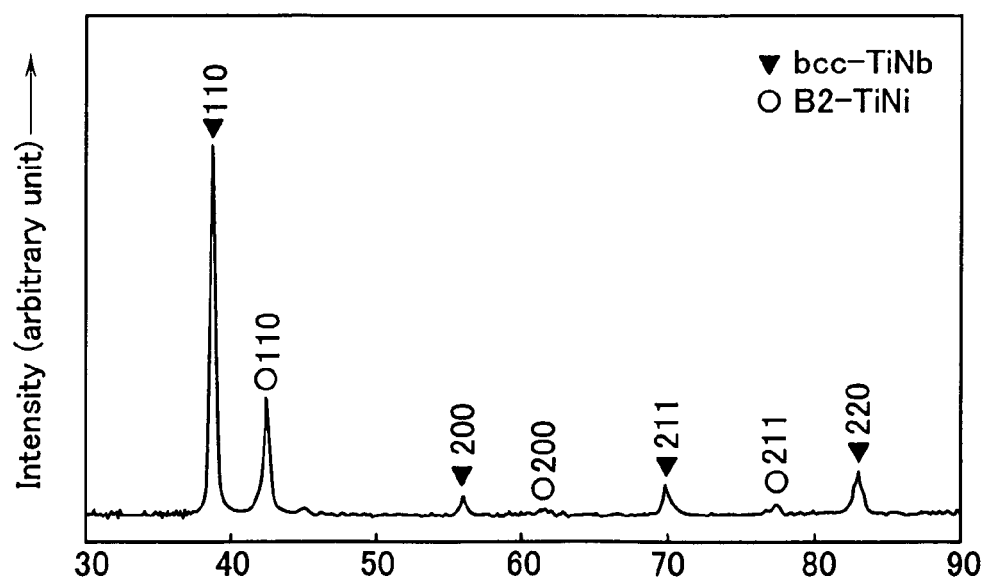
FIG. 3 is a graph showing the X-ray diffraction pattern observed for the alloy material: $Ni_{30}Ti_{31}Nb_{39}$ prepared in Example 1, which is in the cast state.

FIG. 3 is a graph showing the X-ray diffraction pattern observed for the alloy material: $Ni_{30}Ti_{31}Nb_{39}$ prepared in this Example and in the cast state. The diffraction pattern indicates that this alloy material consists of B2 type bcc (body-centered cubic lattice)-NiTi and bcc-TiNb.

Figure 4:
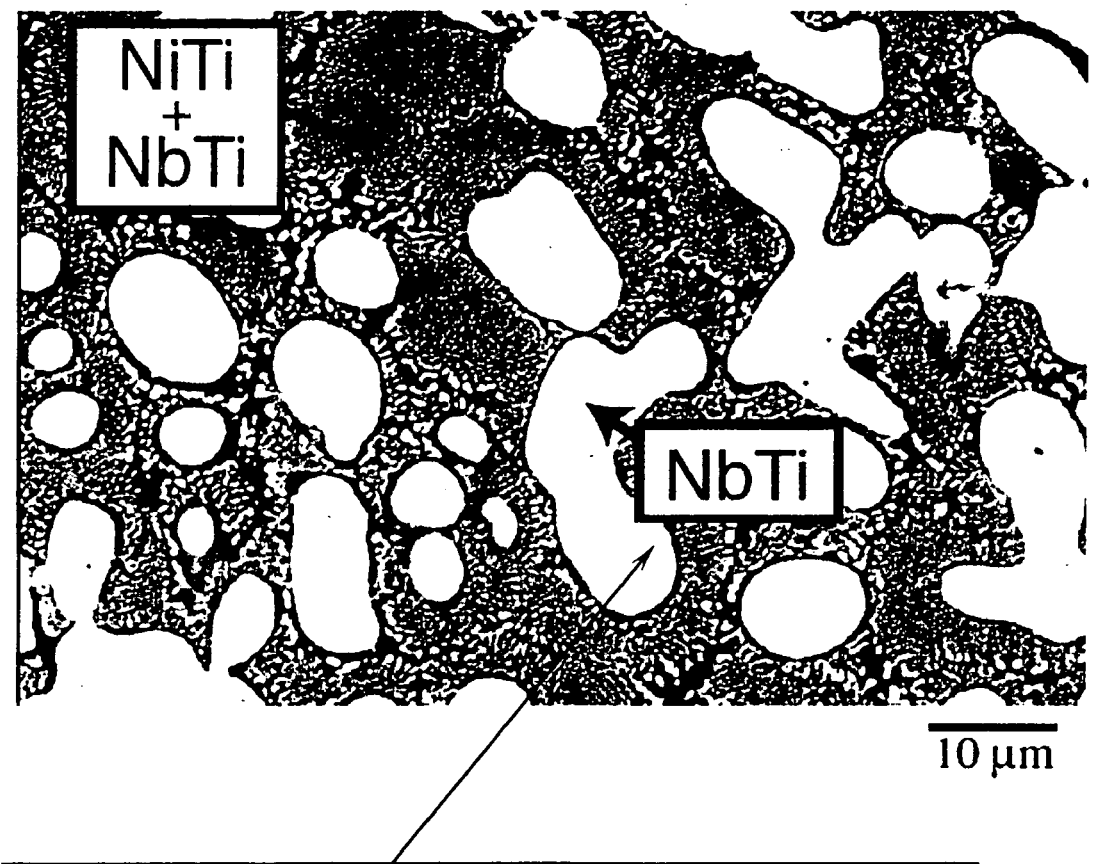
FIG. 4 is an SEM micrograph of the alloy material: $Ni_{30}Ti_{31}Nb_{39}$ prepared in Example 1, which is in the cast state.

FIG. 4 is an SEM micrograph of the alloy material: $Ni_{30}Ti_{31}Nb_{39}$ prepared in this Example and in the cast state. It was found that this alloy consisted of the initial phase NbTi and the eutectic mixture (NiTi+NbTi). This result corresponds to the X-ray diffraction pattern. The initial phase NbTi as a white phase ($Ni_4Ti_{13}Nb_{83}$) was surrounded by the eutectic mixture ($Ni_{41.1}Ti_{38.4}Nb_{20.5}$) and the volume ratio thereof was found to be 40% by volume.

From the foregoing, it was found that the multiple phase alloy consisting of an initial phase NbTi and an eutectic mixture (NiTi+NbTi) showed an excellent hydrogen permeability constant or excellent hydrogen separation-purification properties. Accordingly, the resulting alloy material could be used as a material for preparing a metal membrane for hydrogen separation-purification.

EXAMPLE 2

Figure 5:
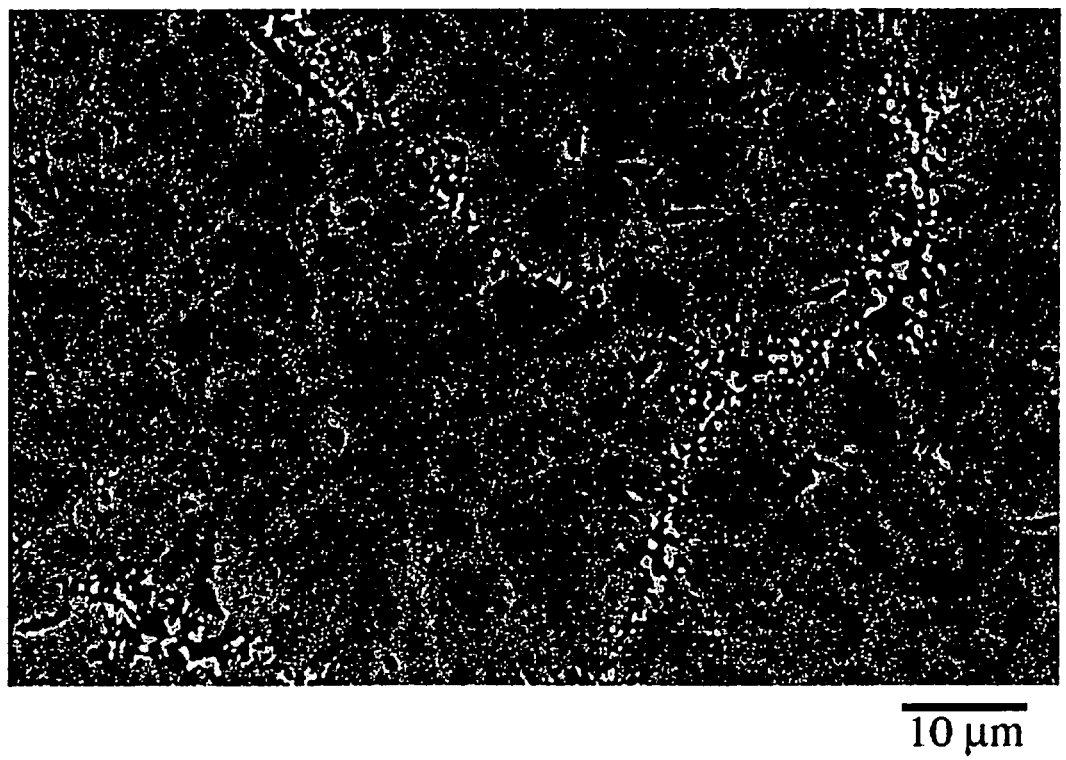
FIG. 5 is an SEM micrograph of the alloy material: $Ni_{41}Ti_{42}Nb_{17}$ prepared in Example 2, which is in the cast state.

A test sample was prepared according to the same procedures as used in Example 1. In this respect, however, the composition thereof was so adjusted that it could satisfy the relations: x=41 mol % and y=42 mol %. The SEM micrograph of the alloy material: $Ni_{41}Ti_{42}Nb_{17}$ prepared in this Example and in the cast state is shown in FIG. 5. It was found that this alloy material almost consisted of an eutectic mixture (NiTi+NbTi). The composition of this alloy material was found to be almost identical to that of the eutectic mixture ($Ni_{41.1}Ti_{38.4}Nb_{20.5}$) observed for the alloy material: $Ni_{30}Ti_{31}Nb_{39}$ prepared in Example 1. The hydrogen permeability constant of this alloy material as determined at 673K (400° C.) was found to be $0.64\times10^{-8}$ ($mol\cdot H_2(m^{-1}s^{-1}Pa^{-0.5})$) which was ⅓ time that observed for the alloy material: $Ni_{30}Ti_{31}Nb_{39}$, but this alloy material could be used as a material for preparing a metal membrane used in the hydrogen-purification.

From the results obtained in the foregoing Examples 1 and 2, the mechanisms of the hydrogen permeation and resistance to hydrogen embrittlement observed for the Ni—Ti—Nb type alloy material would be assumed to be as follows: It would be considered that the hydrogen permeating path in the alloy material: $Ni_{30}Ti_{31}Nb_{39}$ is not realized by the eutectic mixture thereof, but is realized by the initial phase NbTi ($Ni_4Ti_{13}Nb_{83}$). In other words, it would be said that the NbTi phase certainly contributes to the hydrogen permeability of the multiple phase alloy. More specifically, the single phase alloy consisting of NbTi ($Ni_4Ti_{13}Nb_{83}$) undergoes embrittlement when it is hydrogenated and it is finally disintegrated, while the alloy material: $Ni_{30}Ti_{31}Nb_{39}$ maintains its initial morphological characteristics even after it is hydrogenated. This would be because the eutectic microstructure (NiTi+NbTi) controls or minimizes the volume expansion of the NbTi phase to thus inhibit the hydrogen embrittlement of the NbTi phase. In other words, the eutectic microstructure (NiTi+NbTi) play a principal role in the inhibition of any hydrogen embrittlement in the alloy material: $Ni_{30}Ti_{31}Nb_{39}$.

From the foregoing, it can be concluded that the initial phase NbTi mainly contributes to the hydrogen permeability of the three-component Ni—Ti—Nb alloy material, while the hydrogen embrittlement of the phase may be inhibited due to the presence of fine eutectic microstructure (NiTi+NbTi) and the alloy material can thus maintain the desired mechanical properties.

EXAMPLE 3

A test sample was prepared according to the same procedures as used in Example 1. In this respect, however, the composition thereof was so adjusted that it could satisfy the relations: x=30 mol % and y=42 mol %. The hydrogen permeability constant of the resulting alloy material: $Ni_{30}Ti_{42}Nb_{28}$ in its cast state as determined at 673 K was found to be $1.04\times10^{-8}$ ($mol\cdot H_2(m^{-1}s^{-1}Pa^{-0.5})$). Thus, this alloy material could be used as a material for preparing a metal membrane used in the hydrogen-purification.

EXAMPLE 4

A test sample was prepared according to the same procedures as used in Example 1. In this respect, however, the composition thereof was so adjusted that it could satisfy the relations: x=29 mol % and y=50 mol %. The hydrogen permeability constant of the resulting alloy material: $Ni_{29}Ti_{50}Nb_{21}$ in its cast state as determined at 673 K was found to be $1.01\times10^{-8}$ ($mol\cdot H_2(m^{-1}s^{-1}Pa^{-0.5})$). Thus, this alloy material could be used as a material for preparing a metal membrane used in the hydrogen-purification.

EXAMPLE 5

A test sample was prepared according to the same procedures as used in Example 1. In this respect, however, the composition thereof was so adjusted that it could satisfy the relations: x=40 mol % and y=31 mol %. The hydrogen permeability constant of the resulting alloy material: $Ni_{40}Ti_{31}Nb_{29}$ in its cast state as determined at 673K was found to be $0.67\times10^{-8}$ ($mol\cdot H_2(m^{-1}s^{-1}Pa^{-0.5})$). Thus, this alloy material could be used as a material for preparing a metal membrane used in the hydrogen-purification.

EXAMPLE 6

A test sample was prepared according to the same procedures as used in Example 1. In this respect, however, the composition thereof was so adjusted that it could satisfy the relations: x=39 mol % and y=50 mol %. The hydrogen permeability constant of the resulting alloy material: $Ni_{39}Ti_{50}Nb_{11}$, in its cast state as determined at 673K was found to be $0.42\times10^{-8}$ ($mol\cdot H_2(m^{-1}s^{-1}Pa^{-0.5})$). Thus, this alloy material could be used as a material for preparing a metal membrane used in the hydrogen-purification.

The results observed for the Ni—Ti—Nb type alloy materials, in their cast state, prepared in the foregoing Examples 1 to 6 are plotted on FIG. 1 as open circles (◯) and the numerical values (the hydrogen permeability constant determined at 673 K) given below these open circles, which fall within the region enclosed by the broken lines AB, BC, CD and DA (or the region which permits the formation of the multiple phase Ni—Ti—Nb type alloy materials used for hydrogen separation-purification). An eutectic condition comprising an NbTi phase and an NiTi phase which has a composition falling within the range enclosed by the foregoing broken lines would permit the achievement of good hydrogen permeability characteristics and mechanical properties.

COMPARATIVE EXAMPLE 1

Test samples (4 samples in this case) were prepared according to the same procedures as used in Example 1. In this respect, however, the composition of each sample was so adjusted that it could satisfy the relations: x=50 mol % and y=50 mol %; x=59 mol % and y=41 mol %; x=50 mol % and y=40 mol %; or x=49 mol % and y=31 mol %.

Each of the resulting Ni—Ti—Nb type alloy materials has a composition beyond the region which permits the formation of the multiple phase Ni—Ti—Nb type alloy materials used in the preparation of a metal membrane for hydrogen-purification (beyond the region enclosed by the broken lines AB, BC, CD and DA), but these samples permitted the determination of the hydrogen permeability. These samples are shown in FIG. 1 as open circles (◯) present outside the foregoing region. The hydrogen permeability constant of all of the samples which comprised 50% by mole of Ni as determined at 673K was found to be very low on the order of $10^{-10}$($mol\cdot H_2 (m^{-1}s^{-1}Pa^{-0.5})$). Therefore, these samples were not suitable for use in the preparation of a metal membrane for hydrogen-purification.

COMPARATIVE EXAMPLE 2

Test samples (4 samples in this case) were prepared according to the same procedures as used in Example 1. In this respect, however, the composition of each sample was so adjusted that it could satisfy the relations: x=21 mol % and y=51 mol %; x=20 mol % and y=60 mol %; x=20 mol % and y=42 mol %; or x=23 mol % and y=34 mol %. These samples are plotted on FIG. 1 as filled triangles (▲).

Figure 6:
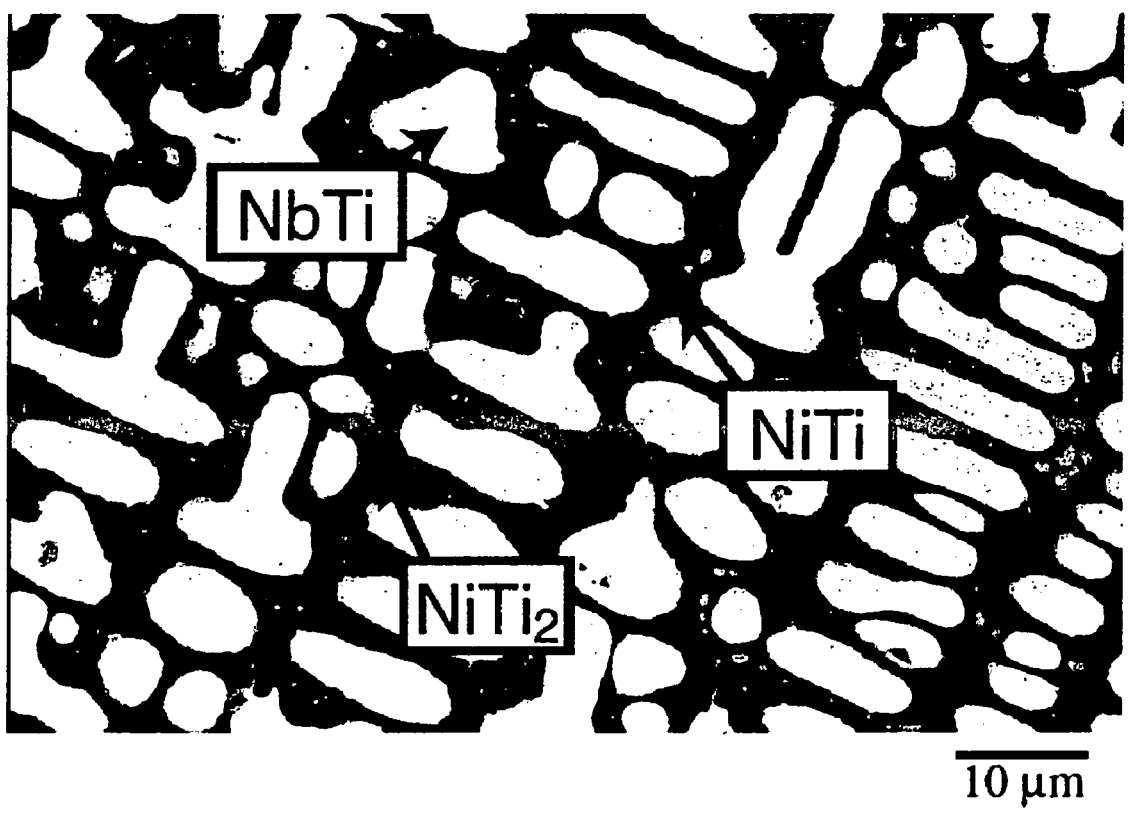
FIG. 6 is an SEM micrograph of the alloy material: $Ni_{21}Ti_{51}Nb_{28}$ prepared in Comparative Example 2, which is in the cast state.

FIG. 6 is an SEM micrograph of the alloy material: $Ni_{21}Ti_{51}Nb_{28}$ among the resulting four kinds of Ni—Ti—Nb type alloy materials. This alloy material is an example which comprises an NbTi phase, an NiTi phase and an NiTi$_2$ phase and which undergoes embrittlement through the occlusion of hydrogen. In this alloy material, the quantity of the NbTi phase is about 50% by volume, while the quantity of the NiTi phase is restricted. The NiTi$_2$ phase shows embrittlement in its cast state, while the NbTi and NiTi phases show ductility in their cast states. Moreover, the NbTi phase undergoes embrittlement when it occludes a large quantity of hydrogen and therefore, the phase is insufficient in the resistance to hydrogen embrittlement. For this reason, these alloy materials could not be used as a material for preparing a metal membrane for hydrogen separation-purification.

In addition, three kinds of Ni—Ti—Nb type alloy materials other than the foregoing one, which has an Ni content of about 20% by mole, likewise show characteristic properties similar to those described above and therefore, they could not be used as a material for preparing a metal membrane for hydrogen separation-purification.

From the foregoing, it is necessary to reduce the amounts of the NiTi$_2$ phase and the NbTi phase in order to solve the problems of embrittlement observed for the alloy materials in their cast states and observed after the hydrogen occlusion.

COMPARATIVE EXAMPLE 3

Test samples (7 samples in this case) were prepared according to the same procedures as used in Example 1. In this respect, however, the composition of each sample was so adjusted that it could satisfy the relations: x=29 mol % and y=71 mol %; x=39 mol % and y=61 mol %; x=30 mol % and y=63 mol %; x=60 mol % and y=31 mol %; x=50 mol % and y=20 mol %; x=40 mol % and y=20 mol %; or x=30 mol % and y=20 mol %. These seven kinds of samples are plotted on FIG. 1 as filled squares (■).

All of the resulting Ni—Ti—Nb type alloys were rich in a brittle NiTi$_2$ or Ni$_3$Ti phase and they were brittle in their cast states. Accordingly, it was impossible to determine the hydrogen permeability thereof and they could not be used as a material for preparing a metal membrane for hydrogen-purification.

As has been discussed above in detail, the present invention can provide an excellent metal membrane simultaneously satisfying the requirements for the hydrogen permeability and for the resistance to hydrogen embrittlement through the use of an Ni—Ti—Nb type multiple phase alloy having a specific composition, which is a multiple phase alloy comprising a phase responsible for the hydrogen permeability and a phase responsible for the resistance to hydrogen embrittlement. For this reason, the present invention permits the hydrogen separation-purification at an extremely high efficiency. Thus, the resulting highly purified hydrogen gas can be used as a fuel supplied to fuel cells and can be applied to fields of production of, for instance, semiconductors, optical fibers and drugs.

What is claimed is:

1. An Ni—Ti—Nb based multiple phase alloy for hydrogen separation-purification consisting of a combined phase which comprises a phase responsible for the hydrogen permeability and a phase responsible for the resistance to hydrogen embrittlement, wherein
the multiple phase comprises an eutectic mixture (NbTi+NiTi) of an NbTi phase in which Ni is dissolved and which is responsible for hydrogen gas-permeability and an NiTi phase in which Nb is dissolved and which is responsible for resistance to hydrogen embrittlement; or a phase comprising the eutectic mixture and the initial phase NbTi.

2. The multiple phase alloy for hydrogen separation-purification as set forth in claim 1, wherein the initial phase NbTi is surrounded by the eutectic mixture.

3. The multiple phase alloy for hydrogen separation-purification as set forth in claim 1, wherein the Ni—Ti—Nb based multiple phase alloy consists of Ni$_x$Ti$_y$Nb$_{(100-x-y)}$ in which x=25~45 mol % and y=25~55 mol %.

4. The multiple phase alloy for hydrogen separation-purification as set forth in claim 1, wherein the Ni—Ti—Nb based multiple phase alloy consists of Ni$_x$Ti$_y$Nb$_{(100-x-y)}$ in which x=25~45 mol % and y=25~55 mol %.

5. The multiple phase alloy for hydrogen separation-purification as set forth in claim 2, wherein the Ni—Ti—Nb based multiple phase alloy consists of Ni$_x$Ti$_y$Nb$_{(100-x-y)}$ in which x=25~45 mol % and y=25~55 mol %.

6. The multiple phase alloy for hydrogen separation-purification as set forth in claim 1, wherein the Ni—Ti—Nb based alloy shows ductility at room temperature in the air.

7. A method for the preparation of an Ni—Ti—Nb based multiple phase alloy for hydrogen separation-purification, consisting of a combined phase which comprises a phase responsible for the hydrogen permeability and a phase responsible for the resistance to hydrogen embrittlement wherein the method comprises the steps of blending desired amounts of Ni, Ti and Nb and then melting a resulting blend according to an arc melting technique carried out in an inert gas atmosphere, a high frequency induction heating technique carried out in an inert gas atmosphere or in a vacuum, an electron beam melting technique carried out in a vacuum, or a laser beam heating technique; wherein
the multiple phase comprises an eutectic mixture (NbTi+NiTi) of an NbTi phase in which Ni is dissolved and which is responsible for hydrogen gas-permeability and an NiTi phase in which Nb is dissolved and which is responsible for resistance to hydrogen embrittlement; or a phase comprising the eutectic mixture and the initial phase NbTi.

8. A metal membrane for hydrogen separation-purification, wherein the metal membrane consists of an Ni—Ti—Nb based multiple phase alloy for hydrogen separation-purification as set forth in any one of claims 1 to 6.

9. The metal membrane for hydrogen separation-purification, as set forth in claim 8, wherein the metal membrane has a thickness ranging from 0.1 to 3 mm.

10. The metal membrane for hydrogen separation-purification, as set forth in claim 8, wherein the metal membrane comprises additional Pd films or Pd alloy films on both sides thereof or on one side thereof to which a feed material is supplied and on an other side thereof from which a purified hydrogen is removed and wherein a thickness of these Pd films or Pd alloy films ranges from 50 to 400 nm.

11. The metal membrane for hydrogen separation-purification, as set forth in claim 9, wherein the metal membrane comprises additional Pd films or Pd alloy films on both sides thereof or on one side thereof to which a feed material is supplied and on an other side thereof from which a purified hydrogen is removed and wherein a thickness of these Pd films or Pd alloy films ranges from 50 to 400 nm.

12. The metal membrane for hydrogen separation-purification, as set forth in claim 10, wherein the Pd films or Pd alloy films are formed by a vacuum deposition technique, a sputtering technique, or an ion-plating technique.

13. The metal membrane for hydrogen separation-purification, as set forth in claim 11, wherein the Pd films or Pd alloy films are formed by a vacuum deposition technique, a sputtering technique, or an ion-plating technique.

14. A method for the preparation of an Ni—Ti—Nb based metal membrane for hydrogen separation-purification, wherein the method comprises the steps of blending desired amounts of Ni, Ti and Nb so that a resulting Ni—Ti—Nb based alloy has a composition satisfying a formula: $Ni_xTi_xNb_{(100-x-y)}$ (wherein x=25~45 mol % and y=25~55 mol %); melting a resulting blend according to an arc melting technique carried out in an inert gas atmosphere, a high frequency induction heating technique carried out in an inert gas atmosphere or in a vacuum, an electron beam melting technique carried out in a vacuum, or a laser beam heating technique, to form a metal membrane; and then forming Pd films or Pd alloy films on both sides of the metal membrane or on a side thereof to which a feed material to be treated is supplied and on an other side thereof from which a purified hydrogen is removed.

15. The multiple phase alloy for hydrogen separation-purification as set forth in claim 7, wherein the initial phase NbTi is surrounded by the eutectic mixture.

16. The multiple phase alloy for hydrogen separation-purification as set forth in claim 7, wherein the Ni—Ti—Nb based multiple phase alloy consists of $Ni_xTi_yNb_{(100-x-y)}$ in which x=25~45 mol % and y=25~55 mol %.

17. The multiple phase alloy for hydrogen separation-purification as set forth in claim 7, wherein the Ni—Ti—Nb based multiple phase alloy consists of $Ni_xTi_yNb_{(100-x-y)}$ in which x=25~45 mol % and y=25~55 mol %.

18. The multiple phase alloy for hydrogen separation-purification as set forth in claim 15, wherein the Ni—Ti—Nb based multiple phase alloy consists of $Ni_xTi_yNb_{(100-x-y)}$ in which x=25~45 mol % and y=25~55 mol %.

19. The multiple phase alloy for hydrogen separation-purification as set forth in claim 7, wherein the Ni—Ti—Nb based alloy shows ductility at room temperature in the air.

* * * * *

UNITED STATES PATENT AND TRADEMARK OFFICE
CERTIFICATE OF CORRECTION

PATENT NO. : 7,468,093 B2
APPLICATION NO. : 11/059641
DATED : December 23, 2008
INVENTOR(S) : Kiyoshi Aoki et al.

It is certified that error appears in the above-identified patent and that said Letters Patent is hereby corrected as shown below:

Column 13,

In the fifth line of Claim 14, replace formula $Ni_xTi_xNb_{(100-x-y)}$ with formula --$Ni_xTi_yNb_{(100-x-y)}$--

Signed and Sealed this

Twenty-first Day of April, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,468,093 B2 |
| APPLICATION NO. | : 11/059641 |
| DATED | : December 23, 2008 |
| INVENTOR(S) | : Kiyoshi Aoki et al. |

It is certified that error appears in the above-identified patent and that said Letters Patent is hereby corrected as shown below:

Column 13,

Claim 14, lines 7-8, replace formula $Ni_xTi_xNb_{(100-x-y)}$ with formula --$Ni_xTi_yNb_{(100-x-y)}$--

This certificate supersedes the Certificate of Correction issued April 21, 2009.

Signed and Sealed this

Twelfth Day of May, 2009

JOHN DOLL
*Acting Director of the United States Patent and Trademark Office*